United States Patent

[11] 3,571,528

[72] Inventor Grant M. Smith
Mountain View, Calif.

[21] Appl. No. 801,103
[22] Filed Feb. 20, 1969
[45] Patented Mar. 16, 1971

[73] Assignee Ampex Corporation
Redwood, Calif.

[54] VERIFYING THE RECORDING OF INFORMATION ON A MAGNETIC RECORDING MEDIUM
15 Claims, 4 Drawing Figs.

[52] U.S. Cl. .......... 179/100.2, 340/174.1
[51] Int. Cl. .......... G11b 5/46, G11b 27/36
[50] Field of Search .......... 179/100.2 (B), 100.2 (K), 100.1 (VC); 340/174.1 (B), 174.1 (F)

*Primary Examiner*—James W. Moffitt
*Assistant Examiner*—Robert S. Tupper
*Attorney*—Robert G. Clay

ABSTRACT: A magnetic head employed to record information on a magnetic tape is activated to read information previously recorded in a frame before it is activated to record information at another frame.

Patented March 16, 1971 3,571,528

2 Sheets-Sheet 1

INVENTOR
GRANT M. SMITH

BY Robert G. Clay

ATTORNEY

INVENTOR.
GRANT M. SMITH

BY Robert S. Clay

ATTORNEY

VERIFYING THE RECORDING OF INFORMATION ON A MAGNETIC RECORDING MEDIUM

FIELD OF THE INVENTION

The present invention relates to verifying the recording of information at single frame locations of a magnetic recording medium. More particularly, it relates to verifying the recording of information by reproducing previously recorded information before new information is recorded in a frame of the magnetic recording medium.

BACKGROUND OF THE INVENTION

Frame-by-frame recording of information on magnetic recording media is performed in document storage and retrieval system, data storage and retrieval systems, and electronic editors used to prepare, revise and rearrange recorded television programs. Occasionally, during a recording operation, the recording system fails to record the information on the magnetic recording medium. Heretofore, it has been the practice to verify the recording of the information on the magnetic recording medium by one of two techniques. In some magnetic recording systems, the current in the recording head is monitored during the recording operation. As long as current existed in the recording head, it was presumed that the information was recorded on the magnetic recording medium. However, when the recording head is clogged with oxide, this technique often provides an erroneous verification of recording. Such errors occur because even if the recording head is clogged with oxide, head current will exist. However, the head will not record the information on the recording medium.

To eliminate the possibility of such erroneous verifications, some magnetic recording systems employ a special reproduce head located downstream from the recording location to interrogate the frame location at which information was to be recorded on the magnetic recording medium. Although this read-after-write technique does not give erroneous verifications, it requires an expensive additional magnetic head.

Considerable advantage is therefore to be gained by providing a technique for verifying that information has been recorded on magnetic recording media which does not give erroneous verifications and obviates the need of additional magnetic heads. Additional advantages are to be gained by employing a single magnetic head which is operated to reproduce and then to record whereby the recording of information on magnetic recording media is verified by reproducing previously recorded information before each uninterrupted recording operation.

SUMMARY OF THE INVENTION

Accordingly, it is an object of this invention to employ the magnetic recording means to verify with certainty the recording of information on the magnetic recording medium.

More particularly, it is an object of this invention to verify with certainty the uninterrupted recording of information on magnetic recording medium without the use of additional magnetic reproducing means.

Another object of this invention is to verify with certainty the recording of a television image at a single frame location of a magnetic video tape.

Still another object of this invention is to minimize the time required to verify with certainty the recording of information on a magnetic recording medium.

Yet another object of this invention is to verify with certainty the recording on magnetic video tape of several discrete television images in the form of discrete video signals of different still image frames while the television images are recorded on the magnetic video tape.

A further object of this invention is to verify with certainty the recording of information on a magnetic recording medium frame by frame without the use of additional magnetic reproducing means.

In accordance with the present invention, the foregoing objects are realized by taking advantage of the ability of means for recording information on magnetic recording media to transduce information from and on the recording media and of the fact that if such recording means cannot reproduce information from the recording medium, it is not able to record satisfactorily. More particularly, a storage location or address of a magnetic recording medium carrying previously recorded information and which is located between a particular storage address at which new information is to be recorded and the location of the means for transducing information from and on the magnetic recording medium is positioned relative to the recording means so that the relative velocity between the magnetic recording medium and the transducing means reaches that required to reproduce information from the recording medium before the storage address carrying previously recorded information reaches the location of the transducing means. When the storage address carrying previously recorded information is in position for access by the transducing means, the transducing means is activated to sense the presence of the previously recorded information. If the transducing means senses the presence of previously recorded information, the relative transportation between the transducing means and the recording medium is continued and the transducing means is activated to record the new information on the recording medium when the particular storage address or series of addresses is in position for access by the transducing means. If the transducing means does not sense information previously recorded at the storage address, the transducing means is not activated to record the new information, and a suitable error signal may be generated, for example, to indicate to an operator that the new information was not recorded on the recording medium. By promptly informing the operator that the new information was not recorded, action can be taken immediately to correct any malfunction in the recording system.

The present invention includes apparatus particularly suited to verify the frame-by-frame recording of discrete signals representing information and, especially, in systems for magnetically recording picture information or other discrete blocks of information in the form of discrete single frame or a portion thereof signals. More particularly, the apparatus of the present invention comprises a selector switch for selectively coupling means for transducing information from and on a magnetic recording medium to a source of information to be recorded and to a sensing means for sensing the detection of recorded information by the transducing means. Means are provided to command the sensing means to sense the detection of previously recorded information prior to recording new information on the magnetic recording medium when a selected storage location or address of the magnetic recording medium carrying the previously recorded information is positioned for access by the transducing means. In response to the sensing of the detection of previously recorded information by the transducing means, the sensing means provides an enabling command which allows the new information to be recorded to be coupled through the selector switch to activate the transducing means when the selected storage address of the magnetic recording medium at which the new information is to be recorded is positioned for access by the transducing means.

With the apparatus of the present invention, the frame-by-frame recording of several discrete blocks of information in the form of discrete single frame or portions thereof signals can be verified without interrupting the verifying and recording procedure except for recording failures. By verifying the recording of information without interrupting the verifying and recording procedure, the time required to record information with certainty is considerably reduced. This feature is particularly important in large capacity, automatic television document storage and retrieval systems where rapid recording of discrete television images of documents is of considerable importance.

BRIEF DESCRIPTION OF THE DRAWINGS

The foregoing and other objects and features of the present invention will become more apparent upon consideration of the following detailed description and claims together with the accompanying drawings of which:

DETAILED DESCRIPTION OF A PREFERRED EMBODIMENT

Figure 1:
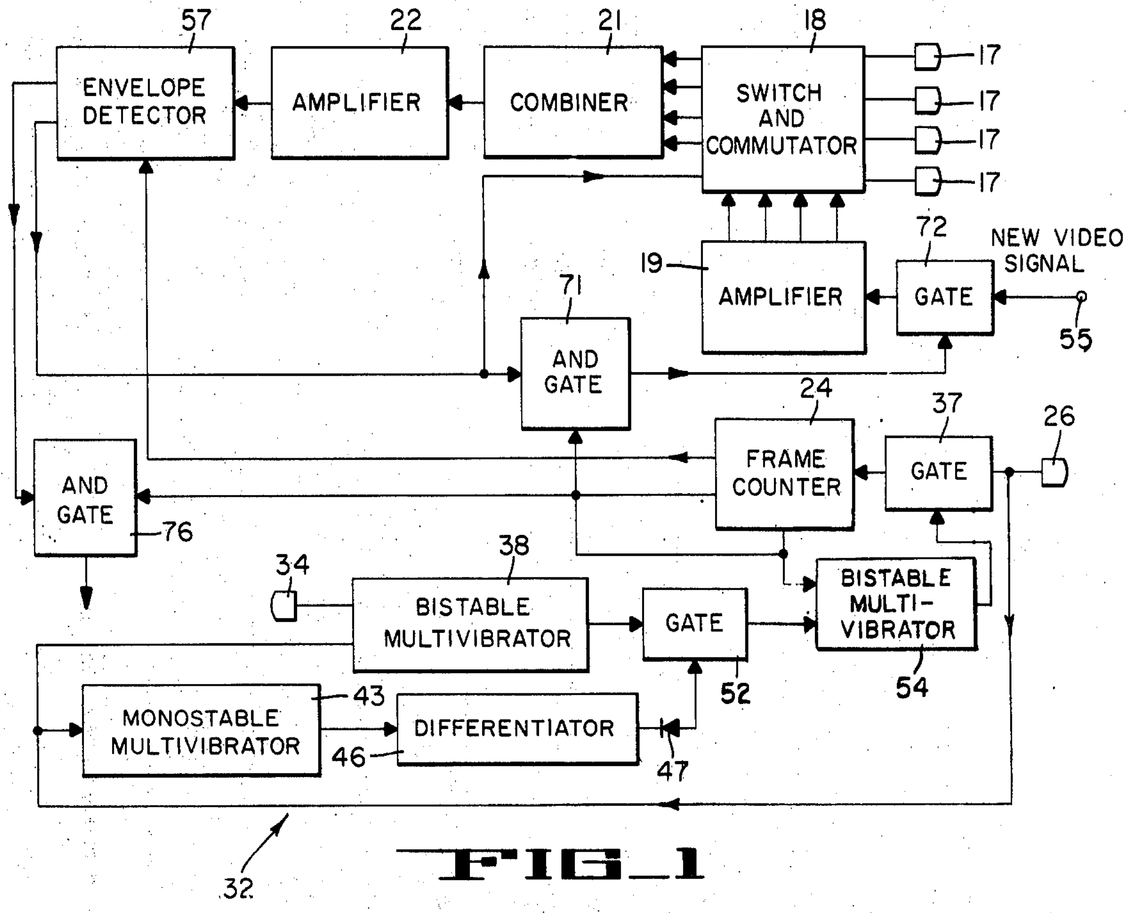
FIG. 1 is a schematic block diagram of an embodiment of the apparatus of the present invention for verifying the frame-by-frame recording of discrete still television image signals.
Figure 2:
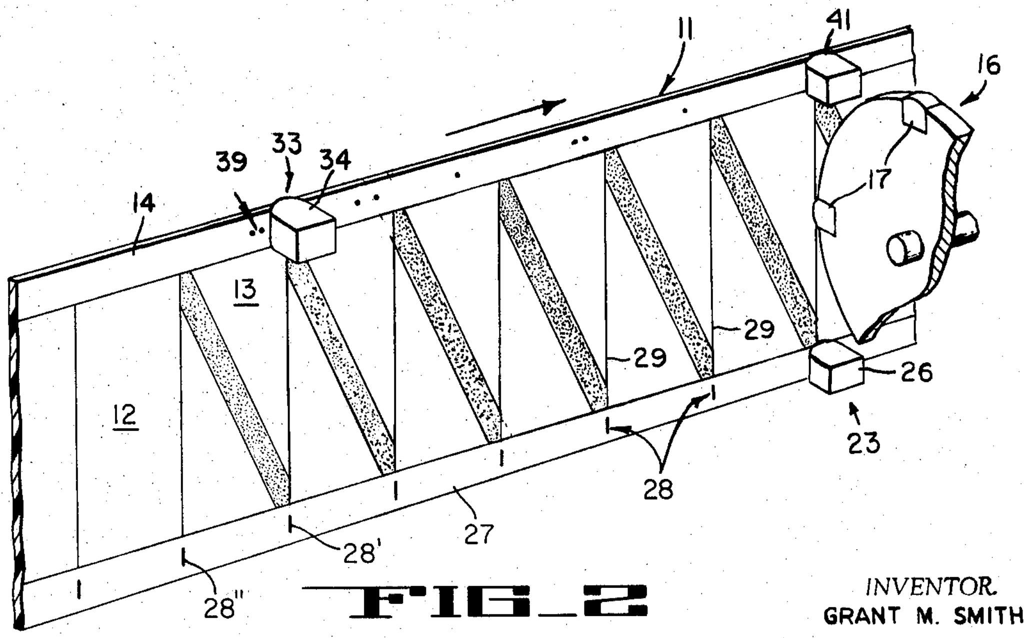
FIG. 2 shows a section of video tape and magnetic recording and reproducing heads used in television document storage and retrieval systems which store discrete television images of documents.
Figure 3:
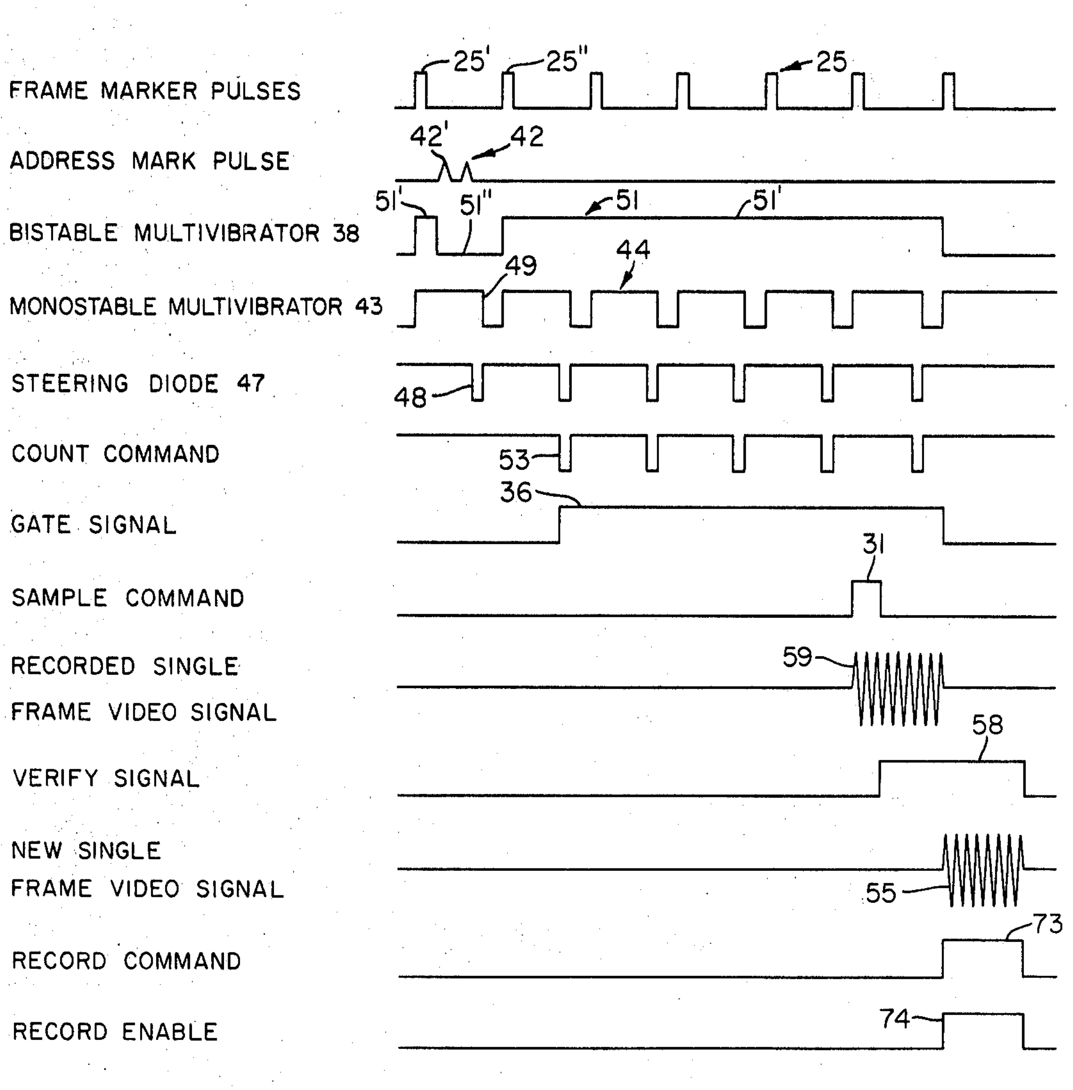
FIG. 3 is a timing diagram illustrating the time sequence in which the elements of FIGS. 1 and 4 operate.

Referring to FIGS. 1—3 inclusive, the technique of verifying the recording of information on a magnetic recording medium in accordance with the present invention will be described with reference to its employment in a television document storage and retrieval system which stores a discrete television or picture image of a document in the form of a single frame or portion thereof video signal. However, the verification technique of the present invention can be employed to verify the recording of other information, such as digital data provided by instruments, recorded as a series of magnetic tracks made transversely across a magnetic tape with the digital data or information gathered in discrete blocks which are recorded at different frames. Furthermore, recording on forms of magnetic recording media other than magnetic tape can be verified in accordance with the present invention.

Considering FIGS. 1—3 in detail, an embodiment of the apparatus of the present invention is illustrated as arranged to verify the recording of single frame video signals of different document images on video tape 11 with the single frame video signal of each new document image recorded at a blank storage address or frame location 12 on the tape 11 following the last frame location 13 at which a video signal of a document image was previously recorded. This organization of recorded video signals is commonly designated as random recording or filing of document images. As will become more apparent from the following detailed description, the verifying technique of the present invention can be employed in information storage and retrieval systems in which the recorded signals are organized in an ordered manner or in a combination of ordered and random manners. In the case of ordered filing of document images, the frames of the video tape 11 are preaddressed by recording a coded signal adjacent thereto on an address track 14 which extends along one edge of the tape 11. The video signals of documents relating to a particular subject are recorded at frames having the same address. When the recorded signals are organized in a combined ordered and random manner, the tape 11 is divided into sections of a plurality of frames, with each section commonly designated as file folders. Each section is preaddressed at the address track 14 and the video signals of documents relating to a particular subject are recorded in a random manner in the same preaddressed section of the tape 11.

The recording and reproducing of a single frame video signals of different document images is accomplished by means for transducing video signals on and from the magnetic tape 11 such as a rotary magnetic head assembly 16 carrying a plurality, usually four, of magnetic heads 17. The head assembly 16 is positioned to sweep the heads 17 successively across the magnetic tape 11 as the tape is moved in the direction of its length. During recording, the magnetic heads 17 are successively coupled to the video signal source by an electronically controlled read and write selector switching and commutating means 18 whereby a single frame video signal is recorded on the tape 11 as a series of magnetic tracks of states of magnetization made transversely across the tape as the magnetic heads 17 are successively swept across the tape. When recording single frame video signals of document images, common television cameras and video processing circuits can be employed to generate a single frame video signal. A record video amplifier 19 receives the video information from the video modulator of the video processing circuits and provides four identical single frame video signals. The four single frame video signals are coupled to the selector switching and commutating means 18 for application to the magnetic heads 17 during recording.

During reproducing, the selector switching and commutating means 18 is set to couple the magnetic heads to a combiner 21 and reproduce video amplifier 22. The combiner 21 and reproduce video amplifier 22 receive the separate portions of the single frame video signal generated by the magnetic heads 17 as they are successively swept over the magnetic tracks in the frame 13 carrying previously recorded information and combine the separate portions by switching to provide the reproduced single frame video signal. The operation and circuit details of the switching and commutating means 18, record video amplifier 19, combiner 21 and reproduce video amplifier 22 as well as the associated rotary magnetic head assembly 16 can be had by reference to U.S. Pat. No. 2,956,114. However, the manually operated read and write selector switch of the switching and commutating means illustrated in the patent would be replaced by a common electronically controlled switch having a gated current source which upon command delivers current to the coil of each two position switch of the selector switch to couple, for example, the record video amplifier 19 to the magnetic heads 17 in place of the normally coupled reproduce video amplifier 22.

In preparation to recording a single frame video signal, the frame 13 carrying a previously recorded single frame video signal which is adjacent to the blank frame location 12 at which the new single frame video signal is to be recorded is positioned downstream from the location 23 of the rotary head assembly 16. The frame 13 is located a sufficient distance downstream from the head assembly location 23 to allow the tape 11 to be accelerated to the velocity relative to the magnetic heads 17 required to transduce single frame video signals on and from the tape 11. A system for positioning a particular frame of the magnetic video tape 11 at a particular location relative to the magnetic head assembly 16 is disclosed in the copending application entitled "Method and Apparatus For Transporting A Recording Medium for Storing Information," Ser. No. 801,100, filed Feb. 20, 1969, and assigned to the assignee of this application.

As the tape 11 is transported to move the frame 13 carrying the previously recorded single frame video signal past the magnetic heads 17 whereby the previously recorded single frame video signal is reproduced, a frame counter 24 counts frame marker pulses 25 provided by a control track magnetic head 26. The control track magnetic head 26 is positioned relative to a control track 27 which extends along the edge of the tape 11 opposite the address track 14 to detect prerecorded frame markers 28 recorded on the control track 27 at locations coinciding with the edges 29 of frames. Each time a frame marker 28 is detected by the control track magnetic head 26, a frame marker pulse 25 is generated which is counted by the frame counter 24. By counting the number of frame markers 28 detected by the control track magnetic head 26, the number of frames transported past the control track magnetic head 26, hence, the rotary magnetic head assembly 16 is determined.

The frame counter 24 is preset to issue a sample command signal 31 when it receives a predetermined number of frame marker pulses 25 from the control track magnetic head 26 corresponding to the number of frames that the tape 11 must be transported to position the frame 13 carrying the previously recorded video signal at the location 23 of the magnetic head assembly 16. If the frames carrying the previously recorded video signal to be reproduced prior to recording new single frame video signals at the adjacent blank frames are always positioned the same distance or number of frames downstream from the location 23 of the rotary magnetic head assembly 16 in preparing to verify and record, the frame counter 24 can be arranged to count the total number of frames that the tape 11 must be transported to position the frame 13 at the location 23 of the head assembly 16. Generally, the frame onto or from which a video signal is to be transduced is positioned thirty frames the location 23 of the head assembly 16 to allow the tape 11 to be brought to proper speed and allow sufficient time to synchronize the operation of the record and reproduce electronic systems to the transportation of the magnetic video tape 11. Hence, the frame counter 24 would be preset to issue the sample command signal 31 when it receives the thirtieth frame marker pulse 25 from the control track magnetic head 26.

If the frame 13 is mistakenly positioned a distance from the location 23 of the head assembly 16 other than that represented by the preset count at which the frame counter 24 issues the sample command signal 31, the new single frame video signal will be recorded on the tape 11 at the wrong frame location. To insure that the new single frame video signal will be recorded on the tape 11 at the proper blank frame 12, means 32 are provided to sense when the blank frame 12 is at a location 33 which is a predetermined number of frames from the location 23 of the head assembly 16 regardless of the number of frames that the blank frame 12 is originally positioned from the location 23 in preparing to record a single frame video signal. In the illustrated embodiment, the address track 14 is monitored to detect the presence of the blank frame 12 at the location 33 by sensing the absence of an address signal at the blank frame location. In random recording systems, the absence of an address signal can be used to detect the presence of a blank frame 12 at the location 33 because the address signal is recorded on the address track 14 when a video signal is recorded in the addressed frame. More particularly, a read address magnetic head 34 located five frames upstream from the location 23 of the head assembly 16 monitors the address track 14 to generate a gate signal 36 when an address signal is missing at a frame location. The gate signal 36 sets an electronic gate 37 to allow frame marker pulses 25 generated by the control track magnetic head 26 to pass to the frame counter 24. To generate the gate signal 36, a first bistable multivibrator 38 has the input of one of its sections coupled to receive the frame marker pulses 25 generated by the control track head 26. The frame marker pulse 25 sets the multivibrator 38 in a conduction state which allows the generation of the gate signal 36. The input of the other section of the bistable multivibrator 38 is coupled to the read address magnetic head 34. The read address head 34 is positioned relative to the address track 14 to detect address marks 39 recorded on the address track 14 in the space coinciding with that between the frame markers 28. The address marks 39 are recorded by the write address magnetic head 41 as the single frame video signal is recorded on the magnetic tape 11. The format of the recorded address marks 39 identifies the frame location of the different recorded video signals. Each time an address mark 39 is detected by the read address head 34, and address mark pulse 42 is generated. The first address mark pulse 42′ sets the bistable multivibrator 38 in its other conduction state which inhibits the generation of the gate signal 36.

A monostable multivibrator 43 has an input of its normally nonconducting section coupled to receive the frame marker pulses 25 generated by the control track head 26. The frame marker pulse 25 causes the normally nonconducting section of the multivibrator 43 to conduct for a predetermined interval less than the interval required to transport successive frame markers 28 past the head assembly 16 and greater than the interval required to transport the space allotted for address marks 39 past the read address head 34. In one embodiment constructed in accordance with the present invention, the distance between frame markers 28 was one-third of an inch, the relative head to tape speed during recording was 5 inches per second (i.p.s.), the frame marker pulse 25 had a pulse width of about 2 milliseconds (msec), and the address marks 39 were recorded within one-fourth of an inch of the leading frame marker, for example, 28′ of frame 13. The time constant of the monostable multivibrator 43 was adjusted so that it remained in its quasi-stable conducting state for 50 msec.

The output 50 msec. square wave signal 44 of the monostable multivibrator 43 is coupled to a serially connected differentiator 46 and steering diode 47 which operate to provide a pulse 48 coinciding with the trailing edge 49 of the square wave signal 44 or the end of the quasi-stable conducting state period of the monostable multivibrator 43. The pulse 48 and the output square wave signal 51 provided by the bistable multivibrator 38 are coupled to the input of an electronic coincident gate 52. The gate 52 generates a count command signal 53 which initiates the generation of the gate signal 36 when it receives a pulse 48 while the bistable multivibrator 38 is in its conducting state set by a frame marker pulse 25.

The gate signal 36 is generated by a second bistable multivibrator 54. The count command signal 53 is coupled to an input of one of the sections of the second bistable multivibrator 53 and sets it in a conduction state resulting in the issuance of the gate signal 36. The electronic gate 37 is coupled to the output of the section of the second bistable multivibrator 54 providing the gate signal 36. As long as the gate signal 36 is present at the input of the electronic gate 37, the electronic gate 37 will allow the frame marker pulses to pass from the control track head 26 to the frame counter 24.

The blank frame sensing means 32 operates as follows. The frame marker pulse 25′ generated by the control track head 26 when detecting a frame marker 28 identifying a frame carrying previously recorded information, e.g., frame marker 28′ of frame 13, sets the bistable multivibrator 38 in the conduction state 51′ which allows the generation of the count command signal 53 by the coincidence gate 52. The frame marker pulse 25′ also initiates the 50 msec. quasi-stable conduction period by the normally nonconducting section of the monostable multivibrator 43. However, since frame 13 carries previously recorded information, address marks 39 are recorded on the address track 14. Hence, the read address head 39 provides an address mark pulse 42′ during the 50 msec. interval following the generation of the frame marker pulse 25′. This address mark pulse 42′ resets the bistable multivibrator 38 in the conduction state 51″ which inhibits the generation of the count command signal 53. Therefore, although a pulse 48 is generated by the operation of the differentiator 46 and steering diode 47 at the end of the 50 msec. quasi-stable conduction period of the monostable multivibrator 43, the inhibited coincidence gate 52 does not provide the count command signal 53.

The frame marker pulse 25″ generated by the control track head 26 when detecting the frame marker pulse 28″ identifying the first blank frame 12 following the last frame 13 carrying previously recorded information again sets the bistable multivibrator 38 in the conduction state 51′ and initiates the 50 msec. quasi-stable conduction period by the monostable multivibrator 43. Since frame 12 is blank, no address marks 39 are recorded on the address track 14 at the frame 12. Hence, no address mark pulse 42 is generated during the 50 msec. interval following the generation of the frame marker pulse 25″. Thus, the bistable multivibrator 38 remains in the conduction state 51″ which allows the generation of the count command signal 53 by the coincidence gate 52. Therefore, when the differentiator 46 and steering diode 47 operate to generate the pulse 48 at the end of the 50 msec. quasi-stable conduction period of the monostable multivibrator 43, the coincidence gate 52 generates a count command signal 53 which causes the second bistable multivibrator 54 to issue the gate signal 36. As will be explained in greater detail hereinbelow, the gate signal 36 sets the electronic gate 37 to allow frame marker pulses 25 to pass to the frame counter 24 until the second bistable multivibrator 54 is reset to its conduction state which removes the gate signal 36 from the electronic gate 37. When only one single frame video signal is to be recorded, a signal 15 issued by the frame counter 24 when its count reaches that indicative of the first blank frame 12 being in position at the location 23 of the rotary head assembly 16 which is employed to reset the bistable multivibrator 54. If a series of single frame video signals is to be recorded without interruption following the frame 13 carrying previously recorded video signals, the frame counter 24 would be preset to issue the reset signal after receiving a number of frame marker pulses 25 equal to the number of frames separating the read address head 39 and magnetic head assembly 16 plus the number of frames to be recorded in succession.

By locating the read address head 34 five frames upstream from the magnetic head assembly location 23 to detect when the blank frame 12 is within five frames of the location 23, it is not necessary to position the blank frame 12 precisely in preparing to accelerate the tape 11 to speed for recording the single frame video signal. When the read address head 34 detects the absence of an address signal, a sequence of events is initiated which always culminates in the recording of the new single frame video signal 55 at the desired blank frame 12. More particularly, the frame counter 24 is preset to issue a sample command signal 31 when its count is advanced to N−1 or four by the input of frame marker pulses 25 following the detection of the absence of an address signal. N is the number of frames the read address head 34 is separated from the rotary magnetic head assembly 16. The fourth frame marker pulse 25 following the detection of the blank frame 12 is employed to initiate the generation of the sample command signal 31 in order to examine the single frame video signal recorded on the frame 13 preceding the blank frame 12 and, thereby, insure that the magnetic heads 17 of the rotary head assembly 16 are operational.

The sample command signal is coupled to an envelope detector 57 to gate it for a selected interval and allow the detector 57 to generate a verify pulse signal 58 if a recombined previously recorded video signal 59 is received from the reproduce video amplifier 22. To verify that the magnetic heads 17 of the rotary head assembly 16 are able to transduce a single frame video signal from the tape 11, hence, able to transduce or record a single frame video signal on the tape 11, it is only necessary to determine if the magnetic heads 17 are able to transduce recorded magnetic tracks from the tape 11. Hence, the frame counter 24 issues a pulse type sample command signal 31 of a width sufficient to enable the envelope detector 57 to sample a portion of the single frame video signal 59 previously recorded at the frame 13. In practice, verification has been performed by sampling the first one quarter of the previously recorded single frame video signal 59. Furthermore, it has been found that false indications of properly functioning magnetic heads 17 can be avoided by sampling the portion of the single frame video signal 59 transduced from the tape 11 by by the first four sweeps of each of the four magnetic heads 17 of the assembly 16. In one embodiment of the present invention constructed for use with a tape 11 having frames one-third inch long and transported at a velocity to produce a relative head-to-tape velocity of 5 i.p.s. while recording and reproducing, the frame counter 24 was arranged to issue sample command pulse 31 having a width of 16.6 msec. immediately upon receiving the fourth frame marker pulse 25 following the detection of the blank frame 12. By sampling only the first part of the previously recorded single frame video signal 59 issued by the reproduce video amplifier 22 for verification purposes, an interval is provided before the blank frame 12 reaches the location 23 of the rotary magnetic head assembly 16 during which the system can be readied for recording the new single frame video signal 55.

Figure 4:
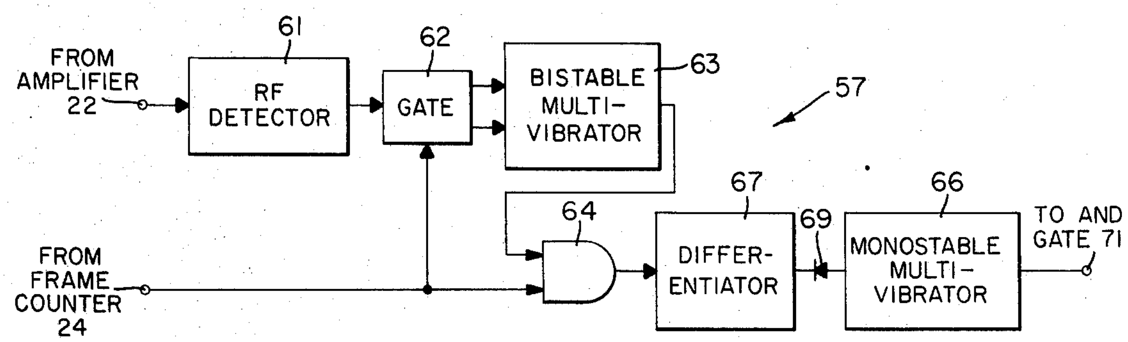
FIG. 4 is a schematic block of the video envelope detector employed in FIG. 1 to generate the verify command signal.

FIG. 4 illustrates one embodiment of the envelope detector 57 which comprises an RF type video envelope detector 61, such as a common diode detector, coupled to receive the output of the video read amplifier 22. The RF detector 61 is set to issue an output signal when the amplitude of the video signal provided by the video read amplifier 22 is above a minimum threshold level. The minimum threshold level is set so that the RF detector 61 provides an output signal only if all four of the magnetic heads 17 transduce recorded magnetic tracks from the tape 11 during their four sweeps of the tape 11. The output signal of the RF detector 61 is coupled to one input of a coincidence gate 62. The other input of the coincidence gate 62 receives the 16.6 msec. sample command pulse signal 31. The output of the coincidence gate 62 is coupled to the inputs of both sections of a bistable multivibrator 63. The coincidence gate 62 sets one of the sections of the bistable multivibrator 63 into conduction when both the sample command pulse signal 31 and output signal of the RF detector 61 are present at the input of the coincidence gate 62. If either of the output signal of the RF detector 61 or the sample command pulse signal 31 is absent from the input of the coincidence gate 62, the other section of the bistable multivibrator 63 is set into conduction. The section of the bistable multivibrator 63 set into conduction by the presence of both of the input signals at the coincident gate 62 is coupled to a gate 64 and releases the inhibit state on the gate 64 when the section is in its conducting state. The release gate 64 allows the sample command pulse signal 31 to pass to the input of a normally nonconducting section of a monostable multivibrator 66. If the section of the bistable multivibrator 63 coupled to release the inhibit state on the gate 64 is set into its nonconducting state, for example, as occurs in the absence of an output signal from the RF detector 61 because one or more of the magnetic heads 17 fail to transduce recorded magnetic tracks during the sample command signal interval, the output of the bistable multivibrator 63 inhibits the gate 64.

The sample command pulse signal 31 passed by the gate 64 is differentiated at the input of the monostable multivibrator 66 by a differentiator 67. The negative pulse coinciding with the trailing edge 68 of the pulse signal 31 is passed by a steering diode 69 to cause the normally nonconducting section of the monostable multivibrator 66 to conduct, thereby, initiating its quasi-stable conduction interval. When only one single frame video signal is to be recorded following a verifying operation, the time constant of the monostable multivibrator 66 is adjusted so that it remains in its quasi-stable conduction state to provide the verify pulse signal 58 having a pulse width of about 84 msec. If a series of single frame video signals is to be recorded without interruption following the verifying operation, the time constant of the monostable multivibrator 66 is adjusted to increase the pulse width of the verify pulse signal 58 about 67 msec. for each additional frame to be recorded without an interruption.

The 84 msec. verify pulse signal 58 is coupled to an AND gate 71 and to the switching and commutating means 18. The verify pulse signal 58 sets the electronically controlled selector switch of means 18 to couple the record video amplifier 19 to the commutator of means 18. This readies the magnetic heads 17 of the rotary magnetic head assembly 16 to receive the new single frame video signal 55 to be recorded from the write video amplifier 19 when the blank frame 12 is in position for recording the video signal thereon. In the absence of the verify pulse signal 58, the electronically controlled selector switch of means 18 couples the reproduce video amplifier 22 and combiner 21 to the commutator of means 18.

Although the magnetic heads 17 are coupled to the record video amplifier 19 before the blank frame 12 is in position for recording the new single frame video signal 55, the AND gate 71 provides an output which inhibits the record video amplifier 19 from coupling excitation current to the magnetic heads. More particularly, the output of the AND gate 71 is coupled to an electronic gate 72 interposed the record amplifier 19 and the record video processing circuits. The electronic gate 72 is inhibited from passing any video signal information to the record video amplifier 19 while the AND gate 71 is in its normally nonconducting state.

To enable the record video amplifier 19 to energize the magnetic heads 17 to record the new single frame video signal 55 at the blank frame 12, or a series of new single frame video signals at successive blank frames, the frame counter 24 is preset to issue a record command signal 73 when its count reaches N or five following the detection of the absence of an address signal. The count of the frame counter 24 is advanced to five by the frame marker pulse 25 generated by the control track magnetic head 26 in response to the detection of the frame marker 28'' immediately following the frame marker 28'' identifying the frame 13 adjacent to the blank frame 12 carrying the previously recorded single frame video signal 59. To facilitate controlling the recording interval, the record command signal 73 is a pulse having a width equal to the time required for the blank frame 12, or a series of successive blank frames when recording more than one single frame video signal without interruption, to pass the magnetic heads 17 of the rotary head assembly 16. In the previously described embodiment including a magnetic video tape 11 comprised of frames having a length of one-third inch and which is transported at a velocity to produce a relative head to tape velocity of 5 i.p.s., the pulse width of the record command pulse signal 73 is set equal to 66.7 msec. when recording only one single frame video signal following a verifying operation. When more than one single frame video signal is to be recorded following the verifying operation, the pulse width of the record command pulse signal is increased an additional 66.7 msec. for each additional single frame video signal to be recorded.

The 66.7 msec. record command pulse signal 73 is coupled to the AND gate 71. As long as the record command pulse signal 73 and verify pulse signal 58 are coincident at the input of the AND gate 71, the AND gate 71 will be set in its conducting state. The conducting AND gate 71 provides a record enable pulse signal 74 which is coupled to the electronic gate 72 to release the inhibit state on the gate 72. In the particular embodiment described in detail, the signals 58 and 73 are coincident at the input of the AND gate 71 for the period of the record command pulse signal 73 or 66.7 msec. With the inhibit state removed from the electronic gate 72, the new single frame video signal 55 can be coupled to the record video amplifier 19, hence, to activate the magnetic heads 17 to record the signal 55 on the magnetic video tape 11 at the blank frame 12.

At the end of the record command pulse signal 73, the AND gate 71 is set in its nonconducting state, thereby, removing the record enable pulse signal 74 from the electronic gate 72. This inhibits the gate 72 from passing any further video signal information to the record video amplifier 19. Since the pulse width of the record command pulse signal 73 is equal to the time required for one or more blank frames to pass the magnetic heads 17 of the rotary head assembly 16, and since the generation of the pulse signal 73 is initiated simultaneously as the edge of the first blank frame 12 reaches the location 23 of the head assembly 16, the recording of video signal information will be synchronized with the transportation of the magnetic video tape 11 so that recording occurs only at the desired blank frames.

At the end of the recording of one or more new single frame video signals, such as video signal 55, the monostable multivibrator 66 of the envelope detector 57 switches from its quasi-stable conducting state to its stable normal conducting state. This removes the verify pulse signal 58 from the input of the AND gate 71 and, also, causes the electronically controlled selector switch of the switching and commutating means 18 to be set to couple the magnetic heads 17 of the rotary magnetic head assembly 16 to the combiner 21 and reproduce video amplifier 22. This readies the switching and commutating means 18, the envelope detector 57 and the AND gate 71 to verify the recording of the next new single frame video signal. The blank frame sensing means 32 and frame counter 24 are readied for the next verification and recording operation by the record command signal 73. The record command signal is coupled to reset the second bistable multivibrator 54 to its conduction state which removes the gate signal 36 from the electronic gate 37. Also, the record command signal 73 may be employed to reset the count in the frame counter 24 to zero. However, if a ring-type counter having a count capacity of five is employed as the frame counter 24, its count will be reset automatically.

From the foregoing description, it will be appreciated that a video signal or series of video signals is recorded on the tape 11 only if the magnetic heads 17 performing the recording operation are functioning properly. If the magnetic heads 17 are not able to transduce video signals from and on the tape 11, the envelope detector 57 will not provide a verify pulse signal 58. Hence, AND gate 71 will be prevented from generating the record enable pulse signal 74. In the absence of the record enable pulse signal 74, the electronic gate 72 remains inhibited while the blank frame 12 passes the magnetic heads 17. Furthermore, the electronically controlled switch of the switching and commutating means 18 is not set to couple the record video amplifier 19 to the magnetic heads 17.

If verification does not occur and it is desired to provide an indication to the operator, or to operate a mechanism to automatically reject a document being scanned by a camera to develop the single frame video signal of the document image, or to stop automatically the apparatus for recording single frame video signals, the output of the monostable multivibrator 66 of the envelope detector 57 is coupled to a second AND gate 76. The AND gate 76 also receives the record command signal 73 provided by the preset frame counter 24. If the monostable multivibrator 66 is not set into its quasi-stable conduction state to provide the verify pulse signal 58, the AND gate 76 generates a NOT verify signal when the record command signal 73 is issued by the frame counter 24. The NOT verify signal can be employed to initiate one of the operations referred to hereinabove with respect to the absence of a verification. The detailed embodiment described hereinabove operates to enable the recording of a new single frame video signal only if it is verified that the magnetic heads 17 are functioning properly. However, by generating a NOT verify signal, the step of activating the magnetic heads 17 to record a new single frame video signal can be allowed to follow the sampling of the previously recorded single frame video signal whether or not the magnetic heads 17 are functioning properly. In such a case, the NOT verify signal would be employed, for example, to stop further recording of new single frame video signals until the magnetic heads 17 are placed in proper working order.

If a verified recording occurs, the transportation of the tape 11 in the forward direction is stopped and then reversed to position the next blank frame upstream from the location 23 of the rotary magnetic head assembly 16 in preparation to record the next new single frame video signal or series of single frame video signals. In this manner, single frame video signals can be sequentially recorded with certainty on the tape 11 without interruption except for the occurrence of a magnetic head failure.

The verifying technique of the present invention has been described as employed in a system wherein new information is recorded in a blank frame 12 following a frame 13 carrying previously recorded information signals. However, the verifying technique can be employed in systems wherein information is recorded in partial sections of a single frame each of which define a discrete storage location whereby a single frame stores more than one discrete information signal. Furthermore, the transducing of previously recorded information recorded in a frame located several frame locations from the blank frame in which the new information is to be recorded can be sampled to generate the verify signal. In such cases, the separation of the frame carrying the previously recorded information and the desired blank frame would be determined during each recording operation to set the frame counter 24 to issue the sample command signal and record enable signal at the proper times.

A particularly important practical aspect of the embodiment shown and described to teach the recording verification technique of the present invention is the use of the prerecorded frame markers 28 to control and synchronize the functioning of the apparatus to perform, at the proper time and in the proper sequence, the step required to obtain a verified recording of a single frame signal on a magnetic recording medium. Most common magnetic recording and reproducing systems utilized such prerecorded frame markers to control and synchronize the operation of the entire system. Hence, the verified recording technique of the present invention is compatible with and is readily adaptable for use in most magnetic recording and reproducing systems currently in use.

While the verify recording technique of the present invention has been described in detail with respect to its application in verifying the recording of single frame video signals on magnetic video tape in a random manner, this particular application is intended only to illustrate one of the many possible applications of the verify recording technique that will become immediately apparent to one skilled in the art upon consideration of the foregoing description. Many modifications of the particularly described verify recording technique are indicated specifically in the foregoing description. However, one particularly significant application of the verify recording technique requires further elaboration. In ordered filing systems, the single frame signal is recorded at particular preaddressed frame. Hence, the blank frame cannot be located by searching the address track of the magnetic recording medium to detect missing address marks. Instead, the blank frame is located by reading the address prerecorded on the magnetic recording medium and electronically comparing them to the address input with the single frame signal to be recorded. When a match occurs, the gate signal 36 is generated, thereby, allowing frame marker pulses 25 to be coupled to the frame counter 24. The sensing means 32 will function similarly as described hereinabove except that an address match coincident with the conduction state 51′ of the bistable multivibrator 38 initiates the generation of the count command signal 53, and an address mismatch resets the bistable multivibrator 38 in its conduction state 51″ which inhibits the generation of the count command signal 53.

Other modifications are possible. For example, in a random file system the portion of the recording medium carrying the single frame information signal can be monitored instead of the address track to detect the blank frame. Alternatively, marks could be recorded on the control track 27 adjacent to the frames to indicate that the frames carry recording information. These marks could be used to indicate the blank frame. The individual frames could be distinguished by detecting the vertical synchronizing pulse when video signals are recorded on magnetic video recording media.

I claim:

1. A method of verifying the recording of information on a magnetic recording medium at a blank storage location thereof by means for transducing information from and on the magnetic recording medium which magnetic recording medium carries previously recorded information at another storage location thereof comprising the steps of positioning the blank storage location relative to the means for transducing information from and on the magnetic recording medium to locate the storage location carrying previously recorded information for access by the transducing means before the blank storage location as the magnetic recording medium and transducing means are transported relative to each other for transducing information from and on the magnetic recording medium; activating the transducing means to transduce previously recorded information from the magnetic recording medium when the storage location carrying the previously recorded information is located for access by the transducing means; and interrogating the transducing means to provide an indication that it transduced previously recorded information from the magnetic recording medium prior to activating the transducing means to transduce information on the magnetic recording medium whereby verification of subsequent the transducing of information on the magnetic recording medium is obtained.

2. The method according to claim 1 further comprising the step of activating the transducing means to transduce information on the magnetic recording medium when the blank storage location is located for access by the transducing means only if an indication is previously provided that the transducing means transduced previously recorded information from the magnetic recording medium 3. The method according to claim 1 further comprising the step of generating a signal indicative of a failure of the transducing means to transduce previously recorded information from the magnetic recording medium.

4. The method according to claim 1 wherein the storage location adjacent to the blank storage location and located for access by the transducing means before the blank storage location carries previously recorded information, and the transducing means is activated to transduce the previously recorded information from the magnetic recording medium when the adjacent storage location is located for access by the transducing means.

5. The method according to claim 4 wherein the transducing means is interrogated while it is activated to transduce from the recording medium the previously recorded information transduced on the initial part of storage location.

6. The method according to claim 4 wherein the magnetic recording medium defines a plurality of storage location frames identified by recorded frame markers located at the edge of each frame and has an address track on which address marks are recorded when information is recorded in a frame, means for transducing address marks from the address track is located relative to the information transducing means to gain access to the address mark location associated with a particular frame a predetermined number frames before the particular frame is located for access by the information transducing means, and means for transducing frame markers is located to gain access to a frame marker simultaneously as the edge of a frame is located for access by the information transducing means, further comprising the step of interrogating the address track to detect the absence of address marks, commencing counting of frame marker pulses when the absence of address marks is detected, generating a signal to initiate the interrogation of the information transducing means when the count reaches one less than said predetermined number of frames, and activating the information transducing means to transduce information on the magnetic recording medium when the count reaches said predetermined number of frames if an indication is previously provided that the transducing means transduced previously recorded information from the magnetic recording medium.

7. Apparatus for verifying the recording of discrete information signals on a magnetic recording medium at a discrete blank storage locations by means for transducing signals from and on the magnetic recording medium, said magnetic recording medium defining a plurality of identifiable discrete storage locations for recording signals thereat in the form of magnetic tracks of states of magnetization and which carries a previously recorded signal at another storage location thereof, and said magnetic recording medium and transducing means are relatively position in preparation to recording the discrete signals to locate the storage location carrying the previously recorded signal to be positioned for access by the transducing means before the blank storage locations as the recording medium and transducing means are transported relative to each other for transducing signals from and on the recording medium, the combination comprising: sensing means for generating a verify signal in response to the detection by the transducing means of previously recorded signals; means for coupling the sensing means to the transducing means to receive a signal from the transducing means to response to the detection of previously recorded signals thereby when the storage address carrying the previously recorded signal is located for access by the transducing means; means for detecting when the identifiable storage location carrying the previously recorded signal is located for access by the transducing means to command the sensing means to sense the detection of the previously recorded signal by the transducing means; and means responsive to the verify signal to couple to the transducing means the signals to be transduced on the magnetic recording medium at the blank storage locations when the blank storage location is located for access by the transducing means.

8. The apparatus according to claim 7 wherein said magnetic recording medium has an address track on which address marks are recorded, and said storage locations are defined by recorded markers; and said means for detecting when the identifiable storage location carrying the previously recorded signal is located for access by the information signal transducing means comprises means for transducing address marks from the address track located relative to the information signal transducing means to gain access to the address mark location associated with a particular storage location a predetermined number of storage locations before the particular storage location is located for access by the information signal transducing means, means for transducing storage location markers located to gain access to a recorded marker as a storage address enters the location for access by the information transducing means, and a counter coupled to said storage location marker transducing means to receive and count storage location marks after the address marks associated with the storage location carrying the previously recorded information signal are transduced, said counter providing a signal to command the sensing means to sense the detection by the information signal transducing means of the previously recorded signal when its count corresponds to the storage location markers required to be transduced from the magnetic recording means to locate the storage location carrying the previously recorded information signal for access by the information signal transducing means.

9. The apparatus according to claim 8 wherein said address marks are recorded on said address track at discrete locations associated with discrete storage locations when an information signal is recorded in the storage location; and said means for detecting when the identifiable storage location carrying the previously recorded signal is located for access by the information signal transducing means further comprises means responsive to the address mark transducing means to provide a count command signal when address marks are absent from the address track at a location associated with the blank storage location, said count command signal coupled to the counter to initiate the counting of storage location markers, and said counter issuing a second signal one count after it issues the signal to command the sensing means, said second signal and verify signal coupled to initiate the transducing of an information signals on the magnetic recording medium.

10. The apparatus according to claim 9 wherein said magnetic recording medium defines a plurality of frame locations of uniform size, and the counter provides a signal which commands the sensing means to sense the first part of the detection by the information signal transducing means of the information signal previously recorded at the frame location.

11. The apparatus according to claim 9 wherein said magnetic recording medium defines a plurality of frame locations for recording high frequency information signal and which is transported relative to said information transducing means; said transducing means is a magnetic head for recording signals on and reproducing signals from said magnetic recording medium; and said sensing means comprises a high frequency detector coupled to receive the reproduced signal generated by said magnetic head and provide an output signal as long as the reproduced signal is greater than a selected threshold strength, and a coincidence circuit means coupled to said detector and counter to receive the detector output signal and the counter sensing command signal and provide the verify signal if a coincidence occurs.

12. The apparatus according to claim 11 wherein said coincidence circuit means issues a NOT verify signal in the absence of a detector output signal when the counter issues a sensing command signal.

13. A method of verifying the recording of information on a magnetic recording medium at blank storage locations thereof by means for transducing information from and on the magnetic recording medium which magnetic recording medium carries previously recorded information at another storage location thereof comprising the steps of activating the transducing means to transduce previously recorded information from the magnetic recording medium when the storage location carrying the previously recorded information is located for access by the transducing means to verify that the transducing means is functioning properly, and then activating the transducing means to transduce information on the magnetic recording medium when a blank storage location is located for access by the transducing means.

14. The method according to claim 13 wherein said transducing means is activated to transduce information on the magnetic recording medium only if the transducing means previously transduced previously recorded information from the magnetic recording medium.

15. The method according to claim 13 wherein said transducing means is activated to transduce information on the magnetic recording medium at a single blank storage location thereof after the transducing means is activated to transduce previously recorded information from the magnetic recording medium.